US012772009B2

(12) United States Patent
Meng et al.

(10) Patent No.: US 12,772,009 B2
(45) Date of Patent: Oct. 20, 2026

(54) BONE CONDUCTION MICROPHONE

(71) Applicant: AAC ACOUSTIC TECHNOLOGIES (SHENZHEN) CO., LTD., Shenzhen (CN)

(72) Inventors: Zhenkui Meng, Shenzhen (CN); Xing Yu, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 202 days.

(21) Appl. No.: 18/625,173

(22) Filed: Apr. 2, 2024

(65) Prior Publication Data

US 2025/0193607 A1 Jun. 12, 2025

Related U.S. Application Data

(63) Continuation of application No. PCT/CN2023/136647, filed on Dec. 6, 2023.

(51) Int. Cl.
*H04R 1/46* (2006.01)
*H04R 19/04* (2006.01)

(52) U.S. Cl.
CPC ....... *H04R 19/04* (2013.01); *H04R 2201/003* (2013.01)

(58) Field of Classification Search
CPC ................ H04R 1/46; H04R 2201/003; H04R 2460/13; H04R 19/04; H04R 19/005; H04R 19/00; H04R 1/38
See application file for complete search history.

(56) References Cited

U.S. PATENT DOCUMENTS

| | | | | |
|---|---|---|---|---|
| 11,895,452 B2 * | 2/2024 | Meng | .................. | H04R 19/005 |
| 2023/0097786 A1 * | 3/2023 | Leahy | .................. | H04R 1/2853 257/416 |
| 2025/0194002 A1 * | 6/2025 | Yan | ........................ | G01H 11/06 |

FOREIGN PATENT DOCUMENTS

| | | | | |
|---|---|---|---|---|
| CN | 114374920 A * | 4/2022 | ............. | H04R 19/04 |

* cited by examiner

*Primary Examiner* — Ryan Robinson
(74) *Attorney, Agent, or Firm* — Wiersch Law Group

(57) ABSTRACT

The present disclosure discloses a housing; a monolayer circuit board engaged with the housing for enclosing a receiving space, and including an acoustic channel; a vibration assembly received in the receiving space, dividing the receiving space into a first cavity and a second cavity; and a MEMS chip including a back cavity, received in the second cavity enclosed by the vibration assembly and the circuit board, and mounted on the circuit board; the acoustic channel is configured to connect the first cavity with the back cavity; an airflow generated by the vibration of the vibration assembly is transmitted to one side of the MEMS chip through the first cavity, the acoustic channel and the back cavity successively; the airflow is transmitted to the other side of the MEMS chip through the second cavity. The bone conduction microphone in the present disclosure has low height and higher sensitivity.

8 Claims, 3 Drawing Sheets

BONE CONDUCTION MICROPHONE

FIELD OF THE PRESENT DISCLOSURE

The present disclosure relates to acoustic-electric conversion technologies, especially relates to a bone conduction microphone.

DESCRIPTION OF RELATED ART

A bone conduction microphone converts the vibration caused by human bone into electric signal. Unlike the traditional microphone picking up acoustic signal by air conduction, the bone conduction microphone has high acoustic fidelity even in noise environment, avoiding the noise interference by air conduction and ensuring high sound quality.

In related art, the bone conduction microphone generally includes a first circuit board and a second circuit board stacked together by welding to form a circuit board assembly with a cavity therein. However, not only the stacked circuit boards do not meet the ultra-thin trend, but increase the material cost and make the package process complex.

Therefore, it is necessary to provide an improved bone conduction microphone to overcome the problems mentioned above.

SUMMARY OF THE INVENTION

One object of the present disclosure is to provide an ultra-thin bone conduction microphone with lower cost and simplified package process.

A bone conduction microphone including: a housing; a monolayer circuit board engaged with the housing for enclosing a receiving space, and including an acoustic channel; a vibration assembly received in the receiving space, dividing the receiving space into a first cavity and a second cavity; and a MEMS chip including a back cavity, received in the second cavity enclosed by the vibration assembly and the circuit board, and mounted on the circuit board; wherein the acoustic channel is configured to connect the first cavity with the back cavity; an airflow generated by the vibration of the vibration assembly is transmitted to one side of the MEMS chip through the first cavity, the acoustic channel and the back cavity successively; the airflow is transmitted to the other side of the MEMS chip through the second cavity.

As an improvement, the acoustic channel includes a first sound hole connected with the first cavity, a second sound hole connected with the back cavity and spaced away from the first sound hole, and a sound path provided in the circuit board and connecting the first sound hole and the second sound hole.3.

As an improvement, the vibration assembly includes a vibrator opposite to the circuit board and a frame connecting the vibrator and the circuit board; the second cavity is enclosed by the frame, the vibrator, and the circuit board.

As an improvement, the vibrator includes a membrane fixed to the frame and a mass fixed to the membrane.

As an improvement, the mass is disposed on a surface of the membrane facing the first cavity.

As an improvement, the mass is disposed on a surface of the membrane facing the second cavity.

As an improvement, further including an ASIC chip electrically connected with the MEMS chip; the ASIC chip is located in the second cavity and mounted on the circuit board.

As an improvement, the MEMS chip includes a substrate fixed to the circuit board and a capacitance system mounted on a side of the substrate away from the circuit board; a back cavity is provided on the substrate; the capacitance system includes a diaphragm and a back plate arranged on a side of the diaphragm away from the back cavity; a plurality of sound holes is provided on the back plate penetrating thereon along a vibration direction of the diaphragm.

As an improvement, the housing is made of metal capable of electromagnetic shielding.

BRIEF DESCRIPTION OF THE DRAWINGS

The accompanying drawings illustrate embodiments and constitute part of the specification, and together with the specification, serve to explain exemplary embodiments of the present disclosure. The accompanying drawings shown are only for illustrative purposes and do not limit the scope of the claims. In all the accompanying drawings, same reference signs refer to similar but not necessarily identical elements.

DETAILED DESCRIPTION OF THE EXEMPLARY EMBODIMENTS

In order to make the inventive objectives, features, and advantages of the present disclosure more understandable, the technical solutions in embodiments of the present disclosure will be described clearly and completely below with reference to the accompanying drawings in the embodiments of the present disclosure. It is apparent that the described embodiments are merely some of rather than all of the embodiments of the present disclosure. All other embodiments acquired by those skilled in the art without creative efforts based on the embodiments in the present disclosure shall fall within the protection scope of the present disclosure.

Figure 1:
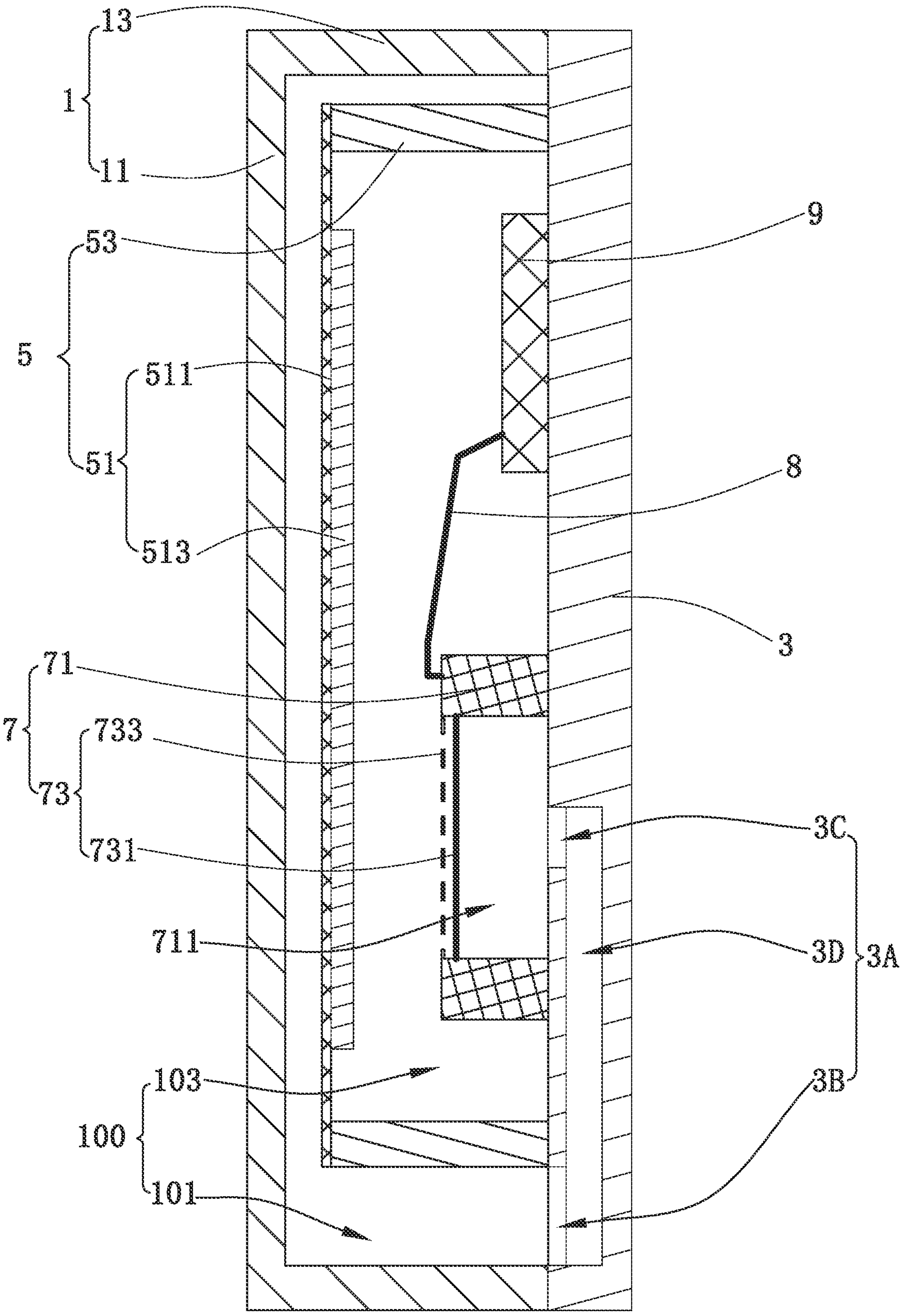
FIG. 1 is an isometric view of a bone conduction microphone in accordance with an exemplary embodiment of the present disclosure.
Figure 2:
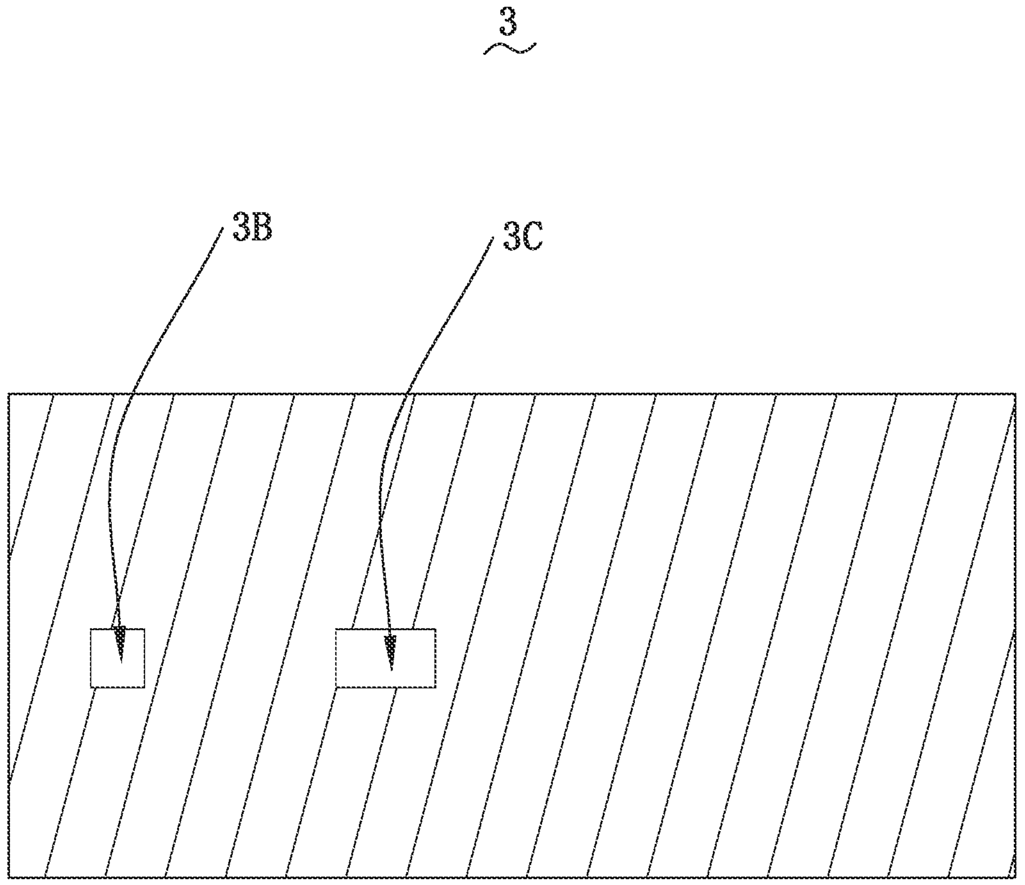
FIG. 2 is an isometric view of a circuit board of the bone conduction microphone in FIG. 1.

Please refer to FIGS. 1-2, a bone conduction microphone provided by an exemplary embodiment of the present disclosure includes a housing 1, a monolayer circuit board 3, a vibration assembly 5, and a MEMS chip 7.

Specifically, the monolayer circuit board 3 engaged with the housing 1 for enclosing a receiving space 100. As shown in FIG. 1, the housing 1 includes a bottom wall 11 opposite to the circuit board 3 and a side wall 13 extending from an edge of the bottom wall 11 and extending to be engaged with the circuit board 3. It should be noted that the monolayer circuit board 3 means that the circuit board 3 is a single layer structure.

An acoustic channel 3A is provided on the circuit board 3. The acoustic channel 3A includes a first sound hole 3B, a second sound hole 3C spaced apart from the first sound hole 3B, and a sound path 3D provided inside the circuit board 3 and connecting the first sound hole 3B and the second sound hole 3C.

The vibration assembly 5 is received in the receiving space 100, dividing the receiving space 100 into a first cavity 101 and a second cavity 103. Furthermore, the first cavity 101 is enclosed by the vibration assembly 5, the circuit board 3, and the housing 1; the second cavity 103 is enclosed by the vibration assembly 5 and the circuit board 3. The first sound hole 3B is connected with the first cavity 101.

Moreover, the vibration assembly 5 includes a vibrator 51 opposite to the circuit board 3 and a frame 53 connecting the vibrator 51 and the circuit board 3. Then, the first cavity 101 is enclosed by the frame 53, the vibrator 51, the circuit board 3, and the housing 1; the second cavity 103 is enclosed by the frame 53, the vibrator 51, and the circuit board 3.

The MEMS chip 7 is located inside the second cavity 103 and mounted on the circuit board 3. Furthermore, the MEMS chip 7 includes a back cavity 711 communicated with the second sound hole 3C. Thus, the acoustic channel 3A is configured to connect the first cavity 101 with the back cavity 711. An airflow generated by the vibration of the vibration assembly 5 is transmitted to one side of the MEMS chip 7 through the first cavity 101, the acoustic channel 3A and the back cavity 711 successively; the airflow is transmitted to the other side of the MEMS chip 7 through the second cavity 103.

In addition, the MEMS chip 7 includes a substrate 71 fixed to the circuit board 3 and a capacitance system 73 mounted on a side of the substrate 71 away from the circuit board 3. The back cavity 711 is provided on the substrate 71 penetrating thereon. The capacitance system 73 includes a diaphragm 731 and a back plate 733 arranged on a side of the diaphragm 731 away from the back cavity 711.

A plurality of sound holes is provided on the back plate 733 penetrating thereon along a vibration direction of the diaphragm 731.

In the present disclosure, when the vibration signal transmitted through bone is conducted to the housing 1 or the circuit board 3, the vibration signal is transmitted to the vibrator 51 subsequently through the frame 53. As a result, the vibrator 51 of the vibration assembly 51 vibrates responding to the vibration signal, thus changing the air pressure of the first cavity 101 and the second cavity 103. For example, the air pressure of the first cavity 101 increases, the air pressure of the second cavity 103 reduces. Consequently, the vibration of the vibrator 51 is transmitted to one side of the diaphragm 731 through the first cavity 101, the first sound hole 3B, the acoustic channel 3A, and the back cavity; the vibration of the vibrator 51 is transmitted to the other side of the diaphragm 731 through the second cavity 103, and the sound holes on the back plate 733. Therefore, the vibration signal acts on the diaphragm 731 via two separately paths in a differential manner, thus improving the sensitivity of the diaphragm 731. And, the vibration of the diaphragm 731 results in capacitance change of the capacitance system 73, thus converting the vibration signal to electric signal.

It should be understood that the bottom wall 11 of the housing 1 is spaced apart from the vibrator 51 along its the vibration direction and the side wall 13 is at least partially spaced apart from the frame 53. As shown in FIGS. 1-2, the whole side wall 13 is spaced apart from the frame 53.

Figure 3:
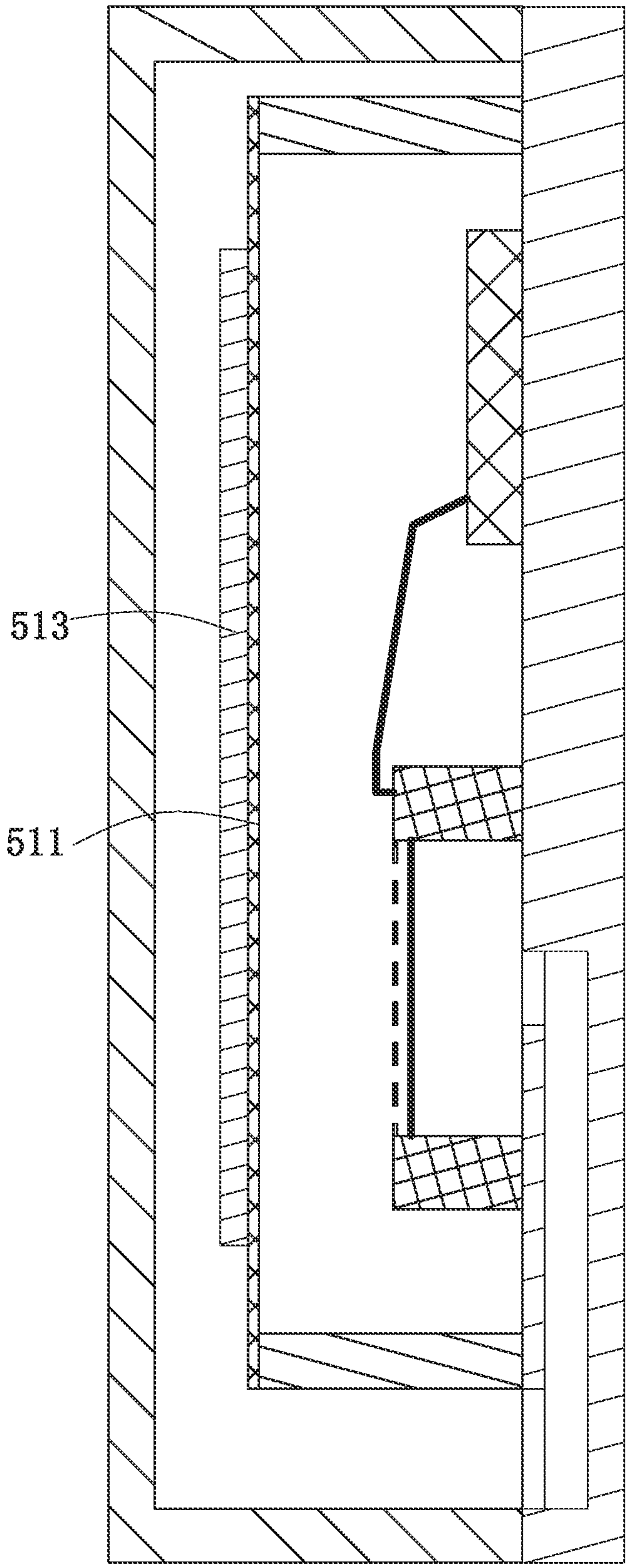
FIG. 3 is an isometric view of a bone conduction microphone in accordance with another exemplary embodiment of the present disclosure.

Concretely, the vibrator 51 includes a membrane 511 fixed to the frame 53 and a mass 513 fixed to the membrane 511. The mass 513 is configured to increase the vibration amplitude of the membrane 511, thereby causing an increase in the amplitude of the pressure changes in the first cavity 101 and the second cavity 103 when the vibrator 51 vibrates. In one embodiment shown in FIGS. 1-2, the mass 513 is disposed on a surface of the membrane 511 facing the second cavity 103. Under this situation, in order to avoid the interference between the mass 513 and the MEMS chip 7, a certain distance between the mass 513 and the MEMS chip 7 should be reserved. In another embodiment shown in FIG. 3, the mass 513 is disposed on a surface of the membrane 511 facing the first cavity 101, which is the only difference from the embodiment as shown in FIGS. 1-2. Under this situation, a certain distance between the mass 513 and the bottom wall 11 of the housing 1 should be reserved.

Furthermore, the housing 1 is made of metal capable of electromagnetic shielding, such as electrically conductive metal. Simultaneously, the housing 1 is configured to protect the internal components and shield external electromagnetic wave.

To further improve the sensitivity of the bone conduction microphone 100, the bone conduction microphone 100 further includes an ASIC chip 9 electrically connected with the MEMS chip 7. The ASIC chip 9 is located in the second cavity 103 and mounted on the circuit board 3. Moreover, the ASIC chip 7 is configured to provide external bias for the MEMS chip 7 for retaining its stable acoustic sensitivity and electrical parameters.

Compared with the related art, the bone conduction microphone provides a monolayer circuit board having an acoustic channel thereon, thereby effectively reducing the height of the bone conduction microphone to meet ultra-thin design trend. The monolayer circuit board also reduces the material cost and simplifies the package process. Furthermore, the airflow generated by the vibration of the vibration assembly is transmitted to one side of the MEMS chip through the first cavity, the acoustic channel and the back cavity successively; the airflow is transmitted to the other side of the MEMS chip through the second cavity. Therefore, the vibration signal acts on the diaphragm via two separately paths in a differential manner, thus improving the sensitivity of the MEMS chip. Furthermore, the first cavity, the acoustic channel, and the back cavity can increase the back chamber of the bone conduction microphone, thus effectively improving the sensitivity and signal-to-noise ratio of the bone conduction microphone.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A bone conduction microphone comprising:

a housing;

a monolayer circuit board engaged with the housing for enclosing a receiving space, and including an acoustic channel;

a vibration assembly received in the receiving space, dividing the receiving space into a first cavity and a second cavity; and a MEMS chip including a back cavity, received in the second cavity enclosed by the vibration assembly and the circuit board, and mounted on the circuit board; wherein the acoustic channel is configured to connect the first cavity with the back cavity; an airflow generated by the vibration of the vibration assembly is transmitted to one side of the MEMS chip through the first cavity, the acoustic channel and the back cavity successively; the airflow is transmitted to the other side of the MEMS chip through the second cavity;

the acoustic channel comprises a first sound hole connected with the first cavity, a second sound hole connected with the back cavity and spaced away from the first sound hole, and a sound path provided in the circuit board and connecting the first sound hole and the second sound hole;

a depth of the first sound hole and a depth of the second sound hole are both smaller than a depth of the sound path; the first sound hole and the second sound hole are both depressed from a surface of the monolayer circuit board facing the MEMS chip; a side of the second sound hole away from the first sound hole is aligned with a side of the sound path away from the first sound hole.

2. The bone conduction microphone as described in claim 1, wherein the vibration assembly comprises a vibrator opposite to the circuit board and a frame connecting the vibrator and the circuit board; the second cavity is enclosed by the frame, the vibrator, and the circuit board.

3. The bone conduction microphone as described in claim 2, wherein the vibrator comprises a membrane fixed to the frame and a mass fixed to the membrane.

4. The bone conduction microphone as described in claim 3, wherein the mass is disposed on a surface of the membrane facing the first cavity.

5. The bone conduction microphone as described in claim 3, wherein the mass is disposed on a surface of the membrane facing the second cavity.

6. The bone conduction microphone as described in claim 1, further comprising an ASIC chip electrically connected with the MEMS chip; the ASIC chip is located in the second cavity and mounted on the circuit board.

7. The bone conduction microphone as described in claim 1, wherein the MEMS chip comprises a substrate fixed to the circuit board and a capacitance system mounted on a side of the substrate away from the circuit board; the back cavity is provided on the substrate; the capacitance system comprises a diaphragm and a back plate arranged on a side of the diaphragm away from the back cavity; a plurality of sound holes is provided on the back plate penetrating thereon along a vibration direction of the diaphragm.

8. The bone conduction microphone as described in claim 1, wherein the housing is made of metal capable of electromagnetic shielding.

* * * * *